United States Patent
Marshansky

(10) Patent No.: US 8,708,611 B2
(45) Date of Patent: Apr. 29, 2014

(54) T-SLOT CUTTER HAVING SEPARATE CENTERING AND TORQUE-TRANSMITTING PORTIONS

(75) Inventor: Amir Marshansky, Kibbutz Yechiam (IL)

(73) Assignee: Iscar, Ltd., Tefen (IL)

( * ) Notice: Subject to any disclaimer, the term of this patent is extended or adjusted under 35 U.S.C. 154(b) by 308 days.

(21) Appl. No.: 13/208,064

(22) Filed: Aug. 11, 2011

(65) Prior Publication Data

US 2012/0039676 A1 Feb. 16, 2012

(30) Foreign Application Priority Data

Aug. 16, 2010 (IL) .......................................... 207624

(51) Int. Cl.
  *B23B 31/11* (2006.01)
  *B23B 31/00* (2006.01)
(52) U.S. Cl.
  CPC ...................................... *B23B 31/00* (2013.01)
  USPC .............................................. 407/47; 408/226
(58) Field of Classification Search
  USPC ......... 407/47; 279/8; 408/226, 231, 233, 239; 403/359.1, 359.5, 359.6
  See application file for complete search history.

(56) References Cited

U.S. PATENT DOCUMENTS

| 1,337,313 | A |   | 4/1920  | Groene     |         |
|-----------|---|---|---------|------------|---------|
| 2,158,120 | A | * | 5/1939  | Hirschberg | 175/417 |
| 2,369,273 | A | * | 2/1945  | Bakewell   | 408/222 |
| 3,621,945 | A | * | 11/1971 | Spry       | 188/71.5|
| 4,733,995 | A |   | 3/1988  | Aebi       |         |
| 5,664,655 | A | * | 9/1997  | Oh         | 192/70.2|
| 5,816,113 | A | * | 10/1998 | Fohl       | 74/552  |
| 6,276,879 | B1|   | 8/2001  | Hecht      |         |
| 6,488,450 | B2|   | 12/2002 | Norris     |         |
| 6,623,202 | B2|   | 9/2003  | Hansson et al. |     |
| 7,387,462 | B2| * | 6/2008  | Hacker     | 403/359.6|

(Continued)

FOREIGN PATENT DOCUMENTS

CH        599820 A    *  5/1978
DE        43 30 826 A1   10/1994

(Continued)

OTHER PUBLICATIONS

English Translation of FR 2379343 (Equivalent to CH 599820).*

(Continued)

*Primary Examiner* — Andrea Wellington
*Assistant Examiner* — Alan Snyder
(74) *Attorney, Agent, or Firm* — Womble Carlyle

(57) ABSTRACT

A cutting head (14) for a T-slot cutter (10) includes opposing cutting head top and intermediate surfaces (18, 20) extending perpendicular to a head rotation axis (A), and a head peripheral surface (22) extending therebetween. The cutting head (14) also includes cutting portions (24) located along the head peripheral surface (22) and a head protrusion (32). The head protrusion (32) extends from the cutting head intermediate surface (20) and includes a head torque-transfer portion (42). The cutting head (14) further includes a cutting head abutment surface (34), and a head bore (36) coaxial with the head rotation axis (A). The head bore (36) extends between, and opens out to, the cutting head top surface (18) and the head protrusion (32). The cutting head (14) also includes a head centering portion (40) distinct from the head torque-transferring portion (42) and located at an axial position different therefrom, along the head rotation axis (A).

20 Claims, 2 Drawing Sheets

(56) References Cited

U.S. PATENT DOCUMENTS

| | | | |
|---|---|---|---|
| 2005/0254890 A1* | 11/2005 | Schulz et al. | 403/359.1 |
| 2006/0051167 A1 | 3/2006 | Massa et al. | |
| 2007/0081873 A1* | 4/2007 | Blomstedt et al. | 409/234 |
| 2009/0123244 A1* | 5/2009 | Buettiker et al. | 408/233 |

FOREIGN PATENT DOCUMENTS

| | | |
|---|---|---|
| DE | 10 2004 023710 A1 | 12/2005 |
| DE | 10 2010 042614 A1 | 4/2011 |
| WO | WO 00/09282 | 2/2000 |
| WO | WO 01/87525 | 11/2001 |
| WO | WO 2007/040433 | 4/2007 |

OTHER PUBLICATIONS

International Search Report dated Dec. 16, 2012 issued in counterpart PCT Application No. PCT/IL2011/000593.

Official Action dated May 27, 2013 issued in Israeli counterpart application (No. 207624).

* cited by examiner

T-SLOT CUTTER HAVING SEPARATE CENTERING AND TORQUE-TRANSMITTING PORTIONS

FIELD OF THE INVENTION

The subject matter of the present application relates to T-slot cutters and portions thereof, and in particular cutting head and shank portions thereof.

BACKGROUND OF THE INVENTION

T-slot cutters are known, for example, from U.S. Pat. No. 4,733,995 and U.S. Pat. No. 6,488,450. In the field there are known methods for securing a T-slot cutter cutting head to a T-slot cutter shank. Securing or clamping arrangements for T-slot cutters perform three operations: centering, transferring torque, and axially locating one member with respect to the other.

U.S. Pat. No. 6,623,202 discloses a known clamping arrangement.

SUMMARY OF THE INVENTION

In accordance with a first aspect of the subject matter of the present application there is provided a cutting head for a T-slot cutter. The cutting head comprises:
  opposing cutting head top and intermediate surfaces extending perpendicular to a head rotation axis (A) defining an axial direction of the cutting head, and a head peripheral surface extending therebetween;
  cutting portions located along the head peripheral surface;
  a head protrusion extending from the cutting head intermediate surface and comprising a head torque-transfer portion;
  a cutting head abutment surface;
  a head bore coaxial with the head rotation axis (A), the head bore extending between, and opening out to, the cutting head top surface and the head protrusion; and
  a head centering portion distinct from the head torque-transfer portion, and located at an axial position different therefrom, along the head rotation axis (A).

The cutting head may have a unitary one-piece construction or may, for example, comprise replaceable cutting inserts.

The head torque-transfer portion may comprise a plurality of recesses, each of which comprises a head torque-transfer surface. Each head torque-transfer surface may be parallel to the head rotation axis (A) and may be planar.

Each of the plurality of recesses may open out axially in a direction away from the cutting head intermediate surface and open out in a radially-inward direction.

The head centering portion may be located at the head bore and may be axially located between the head torque-transfer portion and the cutting head top surface. A majority of the head centering portion may be axially located between the cutting head top and intermediate surfaces. The entire the head centering portion may be axially located between the cutting head top and intermediate surfaces. The head centering portion may have an axial length L1 and the head torque-transfer portion may have an axial length L2 and wherein a ratio L2/L1 is between 0.5 and 2. The head centering portion may comprise a head centering surface having at least three points lying in a first circle, the first circle being concentric with, and oriented perpendicular to, the head rotation axis (A), the first circle having a diameter equal to or smaller than a minimum diameter of the head torque-transfer portion at points thereof lying in a second circle concentric with, and oriented perpendicular to, the head rotation axis (A). The entire centering surface may lie along a periphery of a cylinder coaxial with the head rotation axis (A).

The cutting head may have a screw abutment surface which is axially located between the cutting head top surface and the head centering portion. The cutting head may have a screw abutment surface which is axially located between the cutting head top and intermediate surfaces.

The cutting head may comprise a cutting head abutment surface at the head protrusion distal to the cutting head intermediate surface.

According to another aspect of the subject matter of the present application there is provided a shank for a T-slot cutter. The shank has a shank rotation axis (B) defining an axial direction of the shank. The shank is configured for engagement with a cutting head and comprises a shank protrusion extending between a shank lower surface and a shank top surface. The shank protrusion comprises a shank torque-transfer portion, a shank centering portion distinct from the shank torque-transfer portion and located at an axial position different therefrom, along shank rotation axis (B), and a shank bore opening out to the shank top surface.

The shank may have a unitary one-piece construction.

At least a portion of the shank lower surface may constitute a shank abutment surface.

The shank torque-transfer portion may comprise a plurality of peripheral protrusions, each of which comprises at least one shank torque-transfer surface. Each shank torque-transfer surface may be parallel to the shank rotation axis (B) and may be planar.

Each peripheral protrusion may comprise exactly two shank torque-transfer surfaces.

The shank protrusion may comprise a plurality of grooves, each groove having a groove torque-transfer surface adjacent to one of the shank torque-transfer surfaces. Each groove torque-transfer surface may be coplanar with an associated one of the shank torque-transfer surfaces.

The shank centering portion may be axially located between the shank torque-transfer portion and the shank top surface. The shank protrusion may have a shank protrusion peripheral surface and a diameter of the shank centering portion may be the same as a diameter of the shank protrusion peripheral surface. The shank centering portion may have an axial length L3 and the shank torque-transfer portion may have an axial length L4 and wherein a ratio L4/L3 is between 0.5 and 2. The shank centering portion may comprise a shank centering surface having at least three points lying in a first circle, the first circle being concentric with, and oriented perpendicular to, the shank rotation axis (B), the first circle having a diameter equal to or smaller than a maximum diameter of the shank torque-transfer portion at points thereof lying in a second circle concentric with, and oriented perpendicular to, the shank rotation axis (B). The entire centering surface may lie along a periphery of a cylinder coaxial with the shank rotation axis (B).

According to a further aspect of the subject matter of the present application there is provided a T-slot cutter having a cutter rotation axis (C) and comprising a cutting head and a shank, coaxially and releasably clamped together via a clamping member. The shank torque-transfer portion engages the head torque-transfer portion, the shank centering portion engages the head centering portion, and at least a portion of the shank lower surface abuts the cutting head abutment surface.

The cutting head and shank of the T-slot cutter may have any of the features described hereinabove and below.

BRIEF DESCRIPTION OF THE DRAWINGS

For a better understanding of the present invention and to show how the same may be carried out in practice, reference will now be made to the accompanying drawings, in which.

Figure 1:
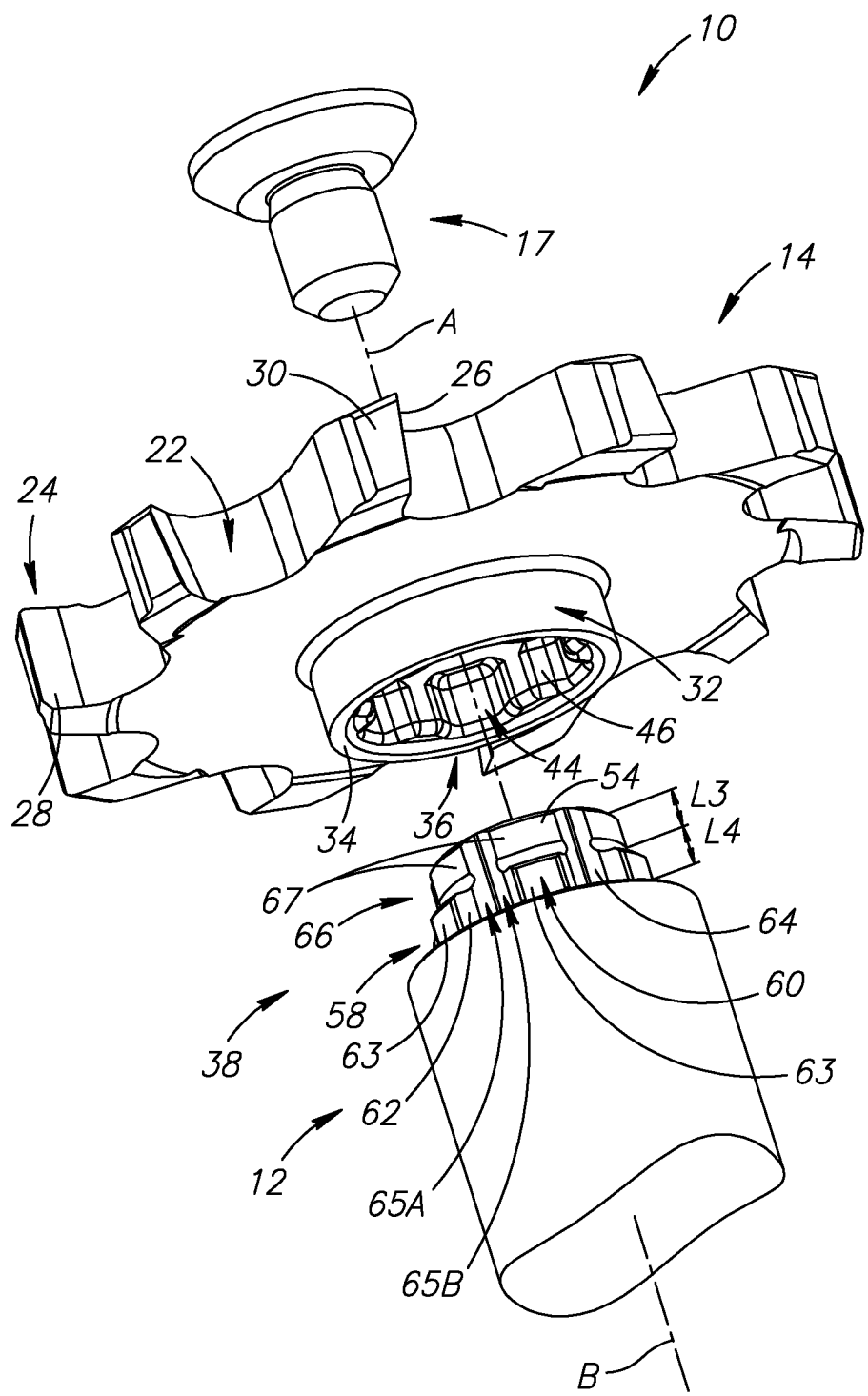
FIG. 1 is an isometric exploded view of a T-slot cutter according to the present invention.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application may be practiced without the specific details presented herein.

Reference is made to FIGS. 1 to 4, showing a T-slot cutter 10 in accordance with the present invention. The T-slot cutter 10 has a cutter rotation axis C and includes a shank 12 and a cutting head 14 coaxially and releasably clamped to the shank 12 via a clamping member, such as a screw 17.

The cutting head 14 may be of the sort used in metal cutting operations. In accordance with some embodiments, the cutting head 14 may be made of hard wear resistant material such as cemented carbide, either by form-pressing or by injection molding and then sintering carbide powders in a binder. The shank 12 may be made of steel or of another metal or metal compound.

The cutting head 14 includes a cutting head top surface 18, an opposing cutting head intermediate surface 20, and a head peripheral surface 22 extending therebetween. The cutting head 14 has a head rotation axis A which is perpendicular to the cutting head top and intermediate surfaces 18, 20. In the non-limiting example embodiment shown, the head peripheral surface 22 includes ten cutting portions 24. However any appropriate number of cutting portions 24 may be included with the cutting head 14.

Each cutting portion 24 may include a cutting edge 26 formed at an intersection of a rake surface 28 and a relief surface 30.

The cutting head 14 includes a head protrusion 32 which may be cylindrical. The cutting head 14 includes a cutting head abutment surface 34. The cutting head abutment surface 34 may be distal the cutting head intermediate surface 20.

The head protrusion 32 may extend in a perpendicular direction from the cutting head intermediate surface 20, in a direction away from the cutting head top surface 18. The head protrusion 32 may terminate at the head abutment surface 34. The head protrusion includes a head torque-transfer portion 42.

The cutting head 14 includes a head bore 36 which is coaxial with the head rotation axis (A). The head bore 36 extending between, and opening out to, the cutting head top surface 18 and the head protrusion 32. The head bore 36 is sized to receive a shank protrusion 38 of the shank 12 partially therein.

The cutting head 14 includes a head centering portion 40 distinct from the head torque-transfer portion 42, and located at an axial position different therefrom, along the head rotation axis (A). In the non-limiting example shown, the head centering portion 40 is axially adjacent to the head torque-transfer portion 42. Another possibility is that the head centering portion 40 may be axially spaced from the head torque-transfer portion 42. The head centering portion 40 comprises a head centering surface 41 having at least three points lying in a first circle, the first circle being concentric with, and oriented perpendicular to, the head rotation axis (A). The first circle has a diameter equal to or smaller than a minimum diameter of the head torque-transfer portion 42 at points thereof lying in a second circle concentric with, and oriented perpendicular to, the head rotation axis (A). The centering surface 41 may be continuous in the circumferential direction. In other words, all points of the centering surface 41 may lie along a periphery of a cylinder coaxial with the head rotation axis (A), and so may be considered a cylindrical head centering surface 41.

The head centering portion 40 may be located at the head bore 36. The head centering portion 40 may be axially located between the cutting head top surface 18 and the head torque-transfer portion 42. Stated differently, with respect to the head rotation axis A, the location of the head centering portion 40 is axially distinct from the head torque-transfer portion 42. In the description and claims, use of the word "axial" and "radial" in connection with a location, length, portion of, etc., of the cutting head 14, are intended to be relative to the head rotation axis (A). In accordance with some embodiments, the entire head centering portion 40 is axially located between the cutting head top and intermediate surfaces 18, 20. According to some embodiments, most of the head centering portion 40 is axially located between the cutting head top and intermediate surfaces 18, 20. In other words, the head centering portion 40 has an axial length L1, the majority of which may extend between the cutting head top and intermediate surfaces 18, 20. In accordance with some embodiments, the head centering portion 40 may extend from between the cutting head top and intermediate surfaces 18, 20 to a point axially outside thereof. A possible advantage of the head centering portion 40 being axially located, at least partially, between the cutting head top and intermediate surfaces 18, 20 may be that the T-slot cutter 10 is provided with reinforcement, i.e. reinforced rigidity, when subjected to cutting forces.

According to some embodiments, the cutting head 14 may include a screw abutment surface 48, which is located partially in the head bore 36, and partially in the cutting head top surface 18. Alternatively, the entire screw abutment surface 48 may be axially located between the cutting head top and intermediate surfaces 18, 20. Such configuration may allow the screw 17 to be disposed internally in the head bore 36 without protruding thereout. In the non-limiting example shown, the head centering portion 40 is axially located between the cutting head intermediate surface 20 and the screw abutment surface 48. In other words the screw abutment surface 48 may be axially located between the cutting head top surface 18 and the head centering portion 40.

The head torque-transfer portion 42 may be disposed between the centering portion 40 and the cutting head abutment surface 34. Stated differently, the head torque-transfer portion 42 may be axially located between the centering portion 40 and the cutting head abutment surface 34. The head torque-transfer portion 42 has an axial length L2, and the ratio L2/L1 may be between 0.5 and 2. A possible advantage of this ratio may be that the cutting head top surface 18 may be devoid of obstructions while still configured for accurate centering and torque transferring of the T-slot cutter 10.

The head torque-transfer portion 42 may include, according to some embodiments, a plurality of recesses 44. In the non-limiting example embodiment shown there are six equally spaced peripheral recesses 44. The recesses 44 may open out axially in a direction away from the cutting head intermediate surface 20, and may open out in a radially-inward direction, i.e. perpendicular with the head rotation axis (A) and into the head bore 36. Each recess 44 includes a single head torque-transfer surface 46. The head torque-transfer surface 46 may be planar. Each head torque-transfer surface 46 may be parallel to the head rotation axis (A). The head torque-transfer surface 46 may be elongated, with a length dimension thereof extending parallel to the head rotation axis A. The recesses 44 are designed such that, when the T-slot cutter 10 is assembled, no other surface of each recess 44, apart from the head torque-transfer surface 46, makes contact with any surface of the shank torque-transfer portion 58.

A shank rotation axis (B) extends longitudinally through the center of the shank 12. The shank rotation axis (B) is coaxial with the head rotation axis (A) when the shank 12 is clamped to the cutting head 14.

The shank 12 includes a shank protrusion 38.

The shank protrusion 38 extends between a shank lower surface 50 and a shank top surface 52. The shank protrusion 38 comprises a shank torque-transfer portion 58, a shank centering portion 66 distinct from the shank torque-transfer portion 58 and located at an axial position different therefrom along the shank rotation axis (B), and a shank bore 56 opening out to the shank top surface 52. In the non-limiting example shown, the shank centering portion 66 is axially adjacent to the head torque-transfer portion 42. Another possibility is that the shank centering portion 66 may be axially spaced from the head torque-transfer portion 42.

At least a portion of the shank lower surface 50 may constitute a shank abutment surface 50. In the non-limiting example shown, the entire shank lower surface 50 constitutes the shank abutment surface 50.

The shank abutment surface 50 may be perpendicular to the shank rotation axis (B).

The shank protrusion 38 may extend perpendicularly from the shank abutment surface 50 and terminates at a shank top surface 52. The shank protrusion 38 may be cylindrical. The shank protrusion 38 may include a shank protrusion peripheral surface 54 which extends between the shank top surface 52 and the shank abutment surface 50.

The shank bore 56 may be threaded.

The shank torque-transfer portion 58 may include a plurality of peripheral protrusions 60. Each of the protrusions 60 may include at least one shank torque-transfer surface 62. In the non-limiting example embodiment shown, there may be six equally spaced peripheral protrusions 60 which extend radially from the shank protrusion 38. The protrusions 60 are formed to correspond to the six recesses 44 of the cutting head 14.

Each shank torque-transfer surface 62 may extend parallel relative to the shank rotation axis B. Each shank torque-transfer surface 62 may extend from the shank abutment surface 50. Each shank torque-transfer surfaces 62 may be planar. Each protrusion 60 may include exactly two shank torque-transfer surfaces 62, each of which may extend at opposing sides of the protrusion 60. Each protrusion 60 including exactly two shank torque-transfer surfaces 62 may allow the shank protrusion 38 to be configured to allow an associated shank 12 to work with both left and right hand cutting heads 14 (in the embodiment shown in the drawings only a right hand cutting head is disclosed). The shank torque-transfer surfaces 62 may be located at two opposing sides of an axially extending central surface 63. The shank torque-transfer surfaces 62 of a given protrusion may be outwardly-slanted so that they converge outwardly to an imaginary line that is radially outward of the associated axially extending central surface 63 belonging to that protrusion 60.

The shank protrusion 38 may be formed with a plurality of grooves 64 (best seen in FIG. 1) adjacent the shank torque-transfer surfaces 62. Each groove 64 may be located between two protrusions 60. Each of the grooves 64 may have a groove torque-transfer surface 65A adjacent to one of the shank torque-transfer surfaces 62. In the non-limiting example embodiment shown, each of the grooves 64 has two adjacent groove torque-transfer surfaces 65A, 65B. The groove torque-transfer surfaces 65A, 65B forming a V-shaped groove in cross-section. Each groove torque-transfer surfaces 65A, 65B may be coplanar with an associated, i.e. adjacent, shank torque-transfer surface 62.

The area of each shank torque-transfer surface 62 may be combined with a groove torque-transfer surface 65A, 65B extending adjacent thereto. Accordingly, the shank torque-transfer surfaces 62 may be part of an enlarged surface contact area including the adjacent groove torque-transfer surfaces 65A, 65B. A possible advantage of such enlarged surface contact area may be reduced strain on each protrusion 60, and/or assurance of surface-to-surface contact with the cutting head 14.

The shank centering portion 66 comprises a shank centering surface 67 having at least three points lying in a first circle, the first circle being concentric with, and oriented perpendicular to, the shank rotation axis (B). The first circle has a diameter equal to or smaller than a maximum diameter of the shank torque-transfer portion 58 at points thereof lying in a second circle concentric with, and oriented perpendicular to, the shank rotation axis (B). The shank centering surface 67 may be continuous in the circumferential direction. In other words, all points of the shank centering surface 67 may lie along a periphery of a cylinder coaxial with the shank rotation axis (B), and so may be considered a cylindrical shank centering surface 67. The entire centering surface 67 may lie along a periphery of a cylinder coaxial with the shank rotation axis (B). The shank centering portion 66 may be located axially between the shank top surface 52 and the shank torque-transfer portion 58.

The shank centering portion 66, according to some embodiments, may have the same diameter as the shank protrusion peripheral surface 54. Such diameter may allow for a simplified production of the shank protrusion 38. The shank protrusion 38 may be cylindrical. The shank centering portion 66 may extend from the shank top surface 52 to the shank torque-transfer portion 58. The shank centering portion 66 has an axial length L3 and the shank torque-transfer portion 58 has an axial length L4. The ratio L4/L3 may be between 0.5 and 2. A possible advantage of a separate centering portion 66 and torque-transfer portion 58 may be that the T-slot cutter 10 has a high clamping accuracy, while at the same time, machining of the shank 12, or e.g., form-pressing the cutting head 14 is optionally performed with less accuracy, lowering production costs.

In an assembled position of the T-slot cutter 10 (shown in FIG. 2), the screw is screw threaded into the shank bore 56 of the shank protrusion 38, and clamps the cutting head 14 to the shank 12. The rotation axis A of the cutting head 14 is coaxial with the rotation axis B of the shank 12 and the rotation axis C of the T-slot cutter 10. The cutting head abutment surface 34 abuts the shank abutment surface 50. The shank centering portion 66 contacts the head centering portion 40. At least a portion of the shank centering portion 66 may be located inside the head centering portion 40. Each peripheral protrusion 60 of the shank torque-transfer portion 58 of the shank 12 is located within a respective counterpart recess 44 of the head torque-transfer portion 42 of the cutting head 14. The shank torque-transfer portion 58 engages the head torque-transfer portion 42.

In the non-limiting example embodiment shown, at least two shank torque-transfer surfaces 62 and adjacent groove torque-transfer surfaces 65A abut respective counterpart head torque-transfer surfaces 46. When the tool operates, according to some embodiments, the shank 12 may become elastically deformed, such that three or more head torque-transfer surfaces 46 abut respective counterpart shank torque-transfer surfaces 62 and groove torque-transfer surfaces 65A. In some cases, all head torque-transfer surfaces 46 of the cutting head 14 abut all respective shank torque-transfer surfaces 62 and groove torque-transfer surfaces 65A of the shank 12. An elastically deformable shank 12, may allow for dispersion of the cutting-force load between engaged torque-transfer surfaces 62.

It will be understood that the shank protrusion 38 could also, optionally, be devoid of groove torque-transfer surfaces 65A.

The cutting head and shank abutment surfaces 34, 50 may constitute a locating portion 68 of the T-slot cutter 10. The head and shank centering portions 40, 66, may constitute a centering portion 70 of the T-slot cutter 10. The head and shank torque-transfer portions 42, 58, and, optionally, the groove torque-transfer surfaces 65A, may constitute a torque-transfer portion 72 of the T-slot cutter 10. The centering portion 70, the torque-transfer portion 72 and the locating portion 68 may constitute a clamping arrangement 16 of the T-slot cutter 10. Notably, the centering portion 70, torque-transfer portion 72 and locating portion 68 may be distinct from each other. To elaborate, in the non-limiting example shown, the torque-transfer portion 72 is disposed between the centering portion 70 and the locating portion 68. Similarly, the head centering portion 40, head torque-transfer portion 42 and head abutment surface 34 may be distinct from each other. Likewise the shank centering portion 66, shank torque-transfer portion 58 and shank abutment surface 50 may be distinct from each other. In any one of the aforementioned examples, the portions and surfaces are at a position different to the other portions. For example, in the non-limiting example shown, the head centering portion 40 is located at an axial position different from the head torque-transferring portion 42, and the head abutment surface 34 is located at radial position different from both the head centering portion 40 and head torque-transferring portion 42, relative to the head rotation axis (A). Similarly, in the non-limiting example shown, the shank centering portion 66 is located at an axial position different from the shank torque-transferring portion 58, and the shank abutment surface 50 is located at radial position different from both the shank centering portion 66 and shank torque-transferring portion 58, relative to the shank rotation axis (B).

The centering portion 70 is axially separated from the torque-transfer portion 72; consequently, the clamping arrangement 16 may be elongated. A possible advantage with an elongated clamping portion 16 is that it may provide an associated T-slot cutter 10 with reinforcement against bending moment at the clamping portion 16.

Figure 2:
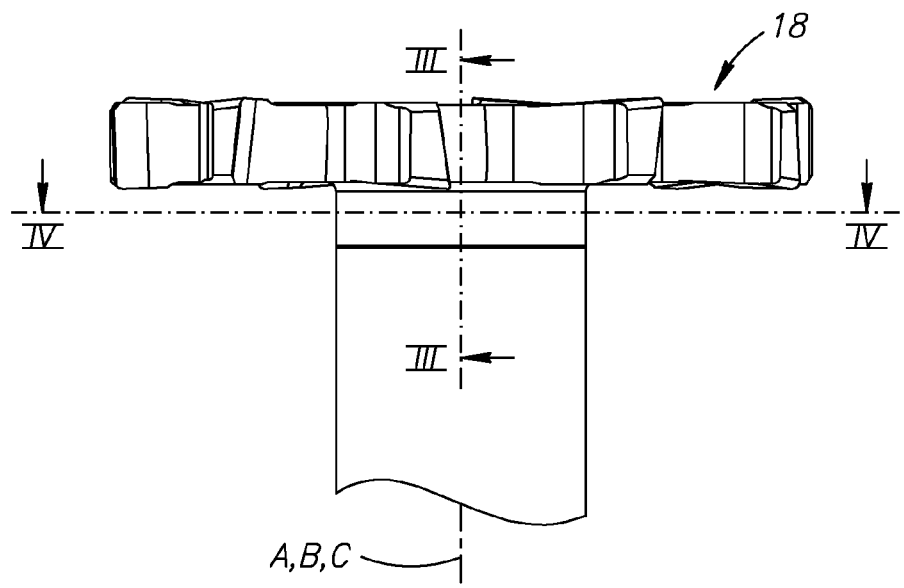
FIG. 2 is a side view of the T-slot cutter of FIG. 1, in an assembled state.
Figure 3:
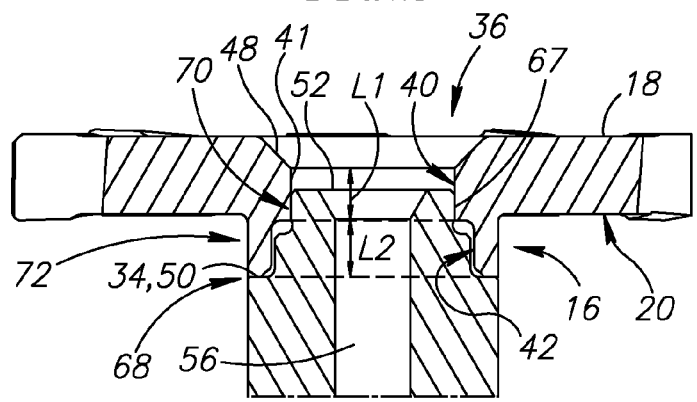
FIG. 3 is a cross section taken along line III-III of FIG. 2.
Figure 4:
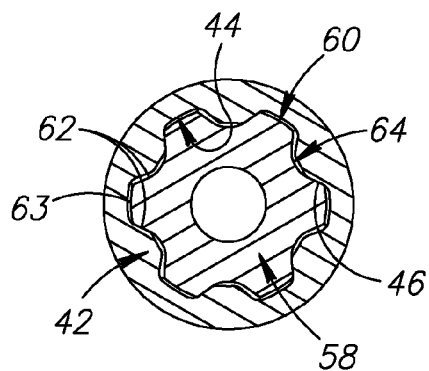
FIG. 4 is a cross section taken along line IV-IV of FIG. 2.

As best shown in FIG. 2, it is further noted that no portion of the T-slot cutter 10 protrudes from the cutting head top surface 18.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting head (14) for a T-slot cutter (10) comprising:
opposing cutting head top and intermediate surfaces (18, 20) extending perpendicular to a head rotation axis (A) defining an axial direction of the cutting head, and a head peripheral surface (22) extending therebetween;
cutting portions (24) located along the head peripheral surface (22);
a head protrusion (32) extending from the cutting head intermediate surface (20) and comprising a head torque-transfer portion (42);
a cutting head abutment surface (34);
a head bore (36) coaxial with the head rotation axis (A), the head bore (36) extending between, and opening out to, the cutting head top surface (18) and the head protrusion (32); and
a head centering portion (40) distinct from the head torque-transferring portion (42) and located at an axial position different therefrom, along the head rotation axis (A).

2. The cutting head (14) according to claim 1, wherein the head torque-transfer portion (42) comprises a plurality of recesses (44), each of which comprises a head torque-transfer surface (46).

3. The cutting head (14) according to claim 2, wherein each head torque-transfer surface (46) is parallel to the head rotation axis (A).

4. The cutting head (14) according to claim 2, wherein each head torque-transfer surface (46) is planar.

5. The cutting head (14) according to claim 2, wherein each of the plurality of recesses (44) opens out axially in a direction away from the cutting head intermediate surface (20) and opens out in a radially-inward direction.

6. The cutting head (14) according to claim 1, wherein the head centering portion (40) is located at the head bore (36) and is axially located between the head torque-transfer portion (42) and the cutting head top surface (18).

7. The cutting head (14) according to claim 6, wherein a majority of the head centering portion (40) is axially located between the cutting head top and intermediate surfaces (18, 20).

8. The cutting head (14) according to claim 6, wherein the entire the head centering portion (40) is axially located between the cutting head top and intermediate surfaces (18, 20).

9. The cutting head (14) according to claim 6, wherein the cutting head (14) has a screw abutment surface (48) which is axially located between the cutting head top surface (18) and the head centering portion (40).

10. The cutting head (14) according to claim 1, wherein the cutting head (14) has a screw abutment surface (48) which is axially located between the cutting head top and intermediate surfaces (18, 20).

11. The cutting head (14) according to claim 1, wherein the head centering portion (40) has an axial length L1 and the head torque-transfer portion (42) has axial length L2 and wherein a ratio L2/L1 is between 0.5 and 2.

12. The cutting head (14) according to claim 1, wherein the head centering portion (40) comprises:
- a head centering surface (41) having at least three points lying in a first circle,
- the first circle being concentric with, and oriented perpendicular to, the head rotation axis (A),
- the first circle having a diameter equal to or smaller than a minimum diameter of the head torque-transfer portion (42) at points thereof lying in a second circle concentric with, and oriented perpendicular to, the head rotation axis (A).

13. The cutting head (14) according to claim 12, wherein the entire centering surface (41) lies along a periphery of a cylinder coaxial with the head rotation axis (A).

14. The cutting head (14) according to claim 1, further comprising a cutting head abutment surface (34) at the head protrusion (32) distal to the cutting head intermediate surface (20).

15. A T-slot cutter (10) having a cutter rotation axis (C) and comprising:
- a cutting head (14) according to claim 1, and
- a shank (12) having a shank rotation axis (B) defining an axial direction of the shank (12), the shank (12) configured for engagement with a cutting head (14) and comprising:
  - a shank protrusion (38) extending between a shank lower surface (50) and a shank top surface (52), the shank protrusion (38) comprising:
    - a shank torque-transfer portion (58);
    - a shank centering portion (66) distinct from the shank torque-transfer portion (58) and located at an axial position different therefrom, along shank rotation axis (B); and
    - a shank bore (56) opening out to the shank top surface (52); wherein:
      - the cutting head (14) is coaxially and releasably clamped to the shank (12) via a clamping member;
      - the shank torque-transfer portion (58) engages the head torque-transfer portion (42);
      - the shank centering portion (66) engages the head centering portion (40); and
      - at least a portion of the shank lower surface (50) abuts the cutting head abutment surface (34).

16. The T-slot cutter (10) according to claim 15, wherein no portion of the T-slot cutter (10) protrudes from the cutting head top surface (18).

17. The T-slot cutter (10) according to claim 15, wherein:
- the head torque-transfer portion (42) comprises a plurality of recesses (44), each of which comprises a head torque-transfer surface (46);
- the head torque-transfer surface (46) of each recess (44) makes contact with the shank torque-transfer portion (58); and
- no other surface of each recess (44), apart from the head torque-transfer surface (46), makes contact with the shank torque-transfer portion (58).

18. The T-slot cutter (10) according to claim 17, wherein:
- the shank torque-transfer portion (58) comprises a plurality of peripheral protrusions (60), each of which comprises at least one shank torque-transfer surface (62);
- the contact of the head torque-transfer surface (46) with the shank torque-transfer portion (58) is via the shank torque-transfer surfaces (62) thereof.

19. The T-slot cutter (10) according to claim 15, wherein:
- the shank torque-transfer portion (58) and the head torque-transfer portion (42) constitute a T-slot cutter torque-transfer portion (72);
- the shank centering portion (66) and the head centering portion (40) constitute a T-slot cutter centering portion (70);
- the at least a portion of the shank lower surface (50) and the cutting head abutment surface (34) constitute a T-slot cutter locating portion (68); and
- the T-slot cutter centering portion (70), the T-slot cutter torque-transfer portion (72) and the T-slot cutter locating portion (68) are each distinct and are at a position different to each other.

20. A T-slot cutter (10) having a cutter rotation axis (C) and comprising:
- a cutting head (14) according to claim 1, and
- a shank (12); wherein:
- the cutting head is mounted on the shank.

* * * * *